United States Patent [19]

Gloriod et al.

[11] Patent Number: 4,617,366

[45] Date of Patent: Oct. 14, 1986

[54] PROCESS FOR MANUFACTURING ETHYLENE TERPOLYMERS AND ETHYLENE COPOLYMERS

[75] Inventors: Pierre Gloriod, Lillebonne; Joel Audureau, Noeux les Mines; Maurice Pellegrini, Lievin, all of France

[73] Assignee: Societe Chimique Des Charbonnages, S.A., France

[21] Appl. No.: 768,443

[22] Filed: Aug. 22, 1985

[30] Foreign Application Priority Data

Aug. 23, 1984 [FR] France .................................. 84 13137

[51] Int. Cl.$^4$ ................................................ C08F 2/34
[52] U.S. Cl. .................................................... 526/272
[58] Field of Search ........................................ 526/272

[56] References Cited

U.S. PATENT DOCUMENTS 3,926,925 12/1975 Kuntz .................................... 526/272

FOREIGN PATENT DOCUMENTS 2091745 8/1982 United Kingdom .

Primary Examiner—Paul R. Michl

Attorney, Agent, or Firm—Finnegan, Henderson, Farabow, Garrett & Dunner

[57] ABSTRACT

A process for the manufacture of radical ethylene terpolymers or copolymers comprising moieties derived from an alkyl (meth)acrylate and/or moieties derived from maleic anhydride by copolymerizing, in the presence of at least one free-radical initiator, a mixture of ethylene, (meth)acrylate and/or maleic anhydride in a device incorporating a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and a temperature of between 140° and 280° C., wherein at least one the alkyl (meth)acrylate and/or maleic anhydride is fed directly into the said polymerization reactor.

The process of the invention has the advantage of not requiring a homogenization device before the entry of the monomers into the reactor.

10 Claims, No Drawings

PROCESS FOR MANUFACTURING ETHYLENE TERPOLYMERS AND ETHYLENE COPOLYMERS

FIELD OF THE INVENTION

The present invention relates to a new process for manufacturing ethylene terpolymers and ethylene copolymers.

More precisely, the invention relates to a new process for manufacturing radical ethylene terpolymers comprising moieties derived from a (meth)acrylate and moieties derived from maleic anhydride, and radical ethylene copolymers comprising moieties derived from a (meth)acrylate and radical ethylene copolymers comprising moieties derived from maleic anhydride.

BACKGROUND OF THE INVENTION

British Pat. No. 2,091,745 describes a process for the manufacture of ethylene terpolymers comprising moieties derived from a (meth)acrylic ester and moieties derived from maleic anhydride, by copolymerization under high pressure, in the presence of at least one free-radical initiator, of a mixture of ethylene, (meth)acrylic ester and maleic anhydride. In this process, the introduction of the (meth)acrylic ester and maleic anhydride monomers into the polymerization reactor is carried out by pumping a solution of maleic anhydride in the (meth)acrylic ester under pressure, mixing this solution with the ethylene stream and homogenizing this mixture before it is fed into the polymerization reactor, the said homogenization being carried out in a venturitype homogenizer and then in a spiral homogenizer.

The applicant has found, in a surprising manner, that in such a process for the manufacture of ethylene terpolymers comprising moieties derived from a (meth)acrylic ester and moieties derived from maleic anhydride, the (meth) acrylic ester and maleic anhydride monomers could be introduced into the polymerization reactor by being fed directly into the said reactor.

SUMMARY OF THE INVENTION

A first aim of the present invention relates to a process for the manufacture of radical ethylene terpolymers comprising moieties derived from an alkyl (meth)acrylate and moieties derived from maleic anhydride by copolymerizing, in the presence of at least one free-radical initiator, a mixture of ethylene, an alkyl (meth)acrylate the alkyl group having from 1 to 6 carbon atoms) and maleic anhydride in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein at least one of the alkyl(meth) acrylate and maleic anhydride is fed directly into the said polymerization reactor.

A second aim of the present invention relates to a process making it possible to manufacture radical ethylene copolymers comprising moieties derived from a comonomer selected from an alkyl (meth)acrylate and maleic anhydride by copolymerizing, in the presence of at least one free-radical initiator, a mixture of ethylene and the said comonomer in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure between 1,000 and 2,500 bars and at a temperature between 140° and 280° C., wherein the comonomer is fed directly into the said polymerization reactor.

In an unexpected manner, despite the absence of homogenization of the monomers before they are fed into the reactor, the copolymerization takes place very well according to the present invention.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

PREFERRED EMBODIMENTS OF THE INVENTION

The present invention consequently provides a process for the manufacture of radical ethylene terpolymers comprising moieties derived from an alkyl (meth)acrylate and moieties derived from maleic anhydride by copolymerizing, in the presence of at least one free-radical initiator, a mixture of ethylene, an alkyl (meth)acrylate and maleic anhydride in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein at least one of the alkyl(meth)acrylate and maleic anhydride is fed directly into the said polymerization reactor.

Several embodiments can be contemplated for preparing terpolymers according to the present invention, contributing great flexibility to the process claimed.

In a first embodiment of the invention, the alkyl (meth)acrylate and maleic anhydride are both introduced directly into the reactor in the form of a solution of maleic anhydride in the alkyl (meth)acrylate. According to a first alternative of this embodiment, additional alkyl (meth)acrylate is fed at the intake of the secondary compressor. According to a second alternative of this embodiment, additional maleic anhydride is fed at the intake of the secondary compressor.

In a second embodiment of the invention, maleic anhydride is fed directly into the reactor and the alkyl (meth)acrylate is fed at the intake of the secondary compressor.

In a third embodiment of the invention the alkyl (meth)acrylate is fed directly into the reactor and maleic anhydride is fed at the intake of the secondary compressor.

By varying the location of the comonomers in the reactor it is possible to modify the distribution of the monomer moieties and the molecular distribution of the terpolymer produced.

When maleic anhydride is introduced alone according to the present invention, be it at the intake of the secondary compressor or directly into the polymerization reactor, it must be fed in the form of a solution in a solvent for maleic anhydride, the properties of which are indicated hereafter.

The introduction of an alkyl (meth)acrylate and maleic anhydride into the reactor according to the present invention is carried out in the form of a solution of maleic anhydride in the alkyl (meth)acrylate in the case of maleic anhydride concentrations below approximatively 300 g/l, or in the form of a solution of maleic anhydride and the alkyl (meth)acrylate in a solvent for maleic anhydride.

The said solvent for maleic anhydride must meet the following requirements:
   be a good solvent for maleic anhydride.
   have a negligible transfer constant with regard to ethylene.
   have a boiling point between 100° and 250° C.

Solvents for maleic anhydride which may be used according to the invention are, for example, propylene carbonate and dimethylformamide.

Some alkyl (meth)acrylate will also be fed according to the present invention in solution in a solvent corresponding to the following requirements:
   good solubility for the alkyl (meth)acrylate.
   negligible transfer constant with regard to ethylene.
   boiling point between 100° and 250° C.

Terpolymers which can be manufactured according to the process of the present invention generally comprise:
   50 to 99.2% by weight of moieties derived from ethylene.
   0.5 to 40% by weight of moieties derives from an alkyl (meth)acrylate.
   0.3 to 10% by weight of moieties derived from maleic anhydride.

Their melt index is generally between 0.1 and 500 dg/min.

The polymerization reactor which can be used according to the invention may be a tubular reactor or an autoclave reactor and may comprise one or more zones.

The bottom of the reactor may be equipped with a pressure release valve enabling the pressure to be reduced to a level between 200 and 300 bars. The mixture of the molten terpolymer produced and the unreacted monomers passes through the said release valve and is conveyed to a medium pressure separator. The terpolymer is collected at the bottom of said separator while the unreacted monomers are recycled, after cooling and decanting of the low molecular weight (less than or equal to 5,000) polymers contained, to the intake of the secondary compressor. The bottom of the medium pressure separator can be equipped with a pressure release valve connected to a low-pressure hopper at the bottom of which the terpolymer is collected, the gas from the low-pressure hopper being recycled to the intake of the primary compressor.

As mentioned above, the secondary compressor is connected directly to the polymerization reactor; its delivery pressure is consequently equal to that in the reactor, allowing for pressure drops.

The free-radical initiators which may be used according to the invention are initiators conventionally used in such a high-pressure polymerization process, such as for example 2-ethylhexyl peroxydicarbonate, ditert-butyl peroxide, tertiobutyl perbenzoate, tertiobutyl 2-ethylperhexanoate and isopropanoyl peroxide. Several initiators may be used simultaneously in the same reactor zone. As is well known to those skilled in the art, the choice of the initiator(s) is a function of the polymerization temperature.

A transfer agent may be introduced into the reaction mixture in a known manner to control the molecular weight of the polymer obtained. Such transfer agents are, for example, alkanes, such as propane and butane, olefins, inparticular α-olefins, aldehydes, ketones and the like.

The terpolymers manufactured according to the present invention have numerous uses, particularly in compositions for sealants, metal coating and hotmelt adhesives, as described in U.S. Pat. Nos. 4,404,299, 4,472,475 and 4,409,286.

The present invention also provides a process which makes it possible to manufacture radical ethylene copolymers comprising moieties derived from a comonomer selected from an alkyl (meth)acrylate and maleic anhydride by copolymerizing, in the presence of at least one free-radical initiator, a mixture of ethylene and comonomer in a device comprizing a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure between 1,000 and 2,500 bars and at a temperature between 140° and 280° C., wherein the comonomer is fed directly into the said polymerization reactor.

If necessary, the comonomer may be introduced according to the present invention in solution in a solvent the properties of which are those indicated below:
   good solvent power for the said comonomer
   a negligible transfer constant with regard to ethylene
   a boiling point between 100° and 250° C.

The free-radical initiators which can be used for the manufacture of the copolymers according to the invention are the same as those mentioned above.

The process of the present invention makes it possible to manufacture radical copolymers comprising 60 to 99.5% by weight of moieties derived from ethylene and 0.5 and 40% by weight of moieties derived from a (meth)acrylate, and radical copolymers comprising 90 to 99.7% by weight of moieties derived from ethylene and 0.3 to 10% by weight of moieties derived from maleic anhydride.

The following examples illustrate the invention in a non-restrictive manner.

EXAMPLE 1

In a device incorporating a primary compressor, the delivery pressure of which is 250 bars, and a secondary compressor connected to a high-pressure polymerization reactor, the reactor is fed with 62 l/h of a solution containing 400 g/l of maleic anhydride in a mixture of 80% of ethyl acrylate and 20% of propylene carbonate. The flow rate of ethylene supplied is 7 t/h. The reactor operates under a pressure of 1800 bars and at a temperature of 195° C.

0.07 t/h of a terpolymer resin containing 3.5% by weight of moieties derived from maleic anhydride and 4.5% by weight of moieties derived from ethyl acrylate and having a melt index of 6 dg/min is collected.

EXAMPLE 2

The same device as Example 1 is used. The reactor is fed with 62 l/h of the same solution of maleic anhydride as in Example 1. The flow rate of ethylene fed is 7 t/h. The reactor operates under a pressure of 1900 bars and at a temperature of 195° C. In addition, 200 l/h of ethyl acrylate are fed at the intake of the secondary compressor.

0.7 t/h of a terpolymer resin containing 3.5% by weight of moieties derived from maleic anhydride and 30% by weight of moieties derived from ethyl acrylate and having a melt index of 18 dg/min is collected.

EXAMPLE 3

The same device as in Example 1 is employed. The reactor is fed with 80 l/h of ethyl acrylate. The flow rate of ethylene fed is 10 t/h. The reactor operates under a pressure of 1600 bars and at a temperature of 250° C.

1.4 t/h of a copolymer resin containing 5% by weight of moieties derived from ethyl acrylate and having a melt index of 0.2 dg/min are collected.

EXAMPLE 4

The same device as in Example 1 is employed. The reactor is fed with 1 l/h of a solution containing 400 g/l of maleic anhydride in propylene carbonate. The flow rate of ethylene fed to the reactor is 100 kg/h. The reactor operates under a pressure of 1700 bars and at a temperature of 205° C. 10 kg/h of a copolymer resin containing 4% by weight of moieties derived from maleic anhydride and having a melt index of 8 dg/min are collected.

It will be apparent to those skilled in the art that various modifications and variations could be made in the process of the invention without departing from the source or spirit of the invention.

What is claimed is:

1. A process for the manufacture of radical ethylene terpolymers comprising 50 to 99.2% by weight of moieties derived from ethylene, 0.5 to 40% by weight of moieties derived from an alkyl (meth)acrylate and 0.3 to 10% by weight of moieties derived from maleic anhydride by copolymerizing, in the presence of at least one free-radical initiator, a mixture of ethylene, an alkyl (meth)acrylate and maleic anhydride, in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein at least one of the alkyl (meth)acrylate and maleic anhydride is fed directly into the said polymerization reactor.

2. A process according to claim 1, wherein the alkyl (meth)acrylate and maleic anhydride are introduced directly into the said reactor at the same time.

3. A process according to claim 2, wherein the alkyl (meth)acrylate and maleic anhydride are introduced in the form of a solution of maleic anhydride and alkyl (meth)acrylate in a solvent.

4. A process according to one of claims 2 and 3, wherein additional alkyl (meth)acrylate is fed at the intake of the said secondary compressor.

5. A process according to one of claims 2 and 3, wherein additional maleic anhydride is fed at the intake of the said secondary compressor.

6. A process according to claim 1, wherein maleic anhydride is fed directly into the said reactor and the alkyl (meth)acrylate is fed at the intake of the said secondary compressor.

7. A process according to claim 1, wherein the alkyl (meth)acrylate is fed directly into the said reactor and maleic anhydride is fed at the intake of the said secondary compressor.

8. A process for the manufacture of radical ethylene copolymers comprising moieties derived from a comonomer selected from an alkyl (meth)acrylate and maleic anhydride, by copolymerizing, in the presence of at least one free-radical initiator, a mixture of ethylene and comonomer in a device comprising a primary compressor, the delivery pressure of which is between 200 and 300 bars, connected to a secondary compressor, which is connected directly to a polymerization reactor, fresh ethylene being fed at the intake of the said primary compressor and said copolymerization being carried out in the said polymerization reactor under a pressure between 1,000 and 2,500 bars and a temperature between 140° and 280° C., wherein the comonomer is fed directly into the said reactor.

9. A process according to claim 8, wherein the comonomer is an alkyl (meth) acrylate the concentration of which in the copolymer is between 0.5 and 40% by weight, the ethylene concentration being 60 to 99.5% by weight.

10. A process according to claim 8, wherein the said comonomer is maleic anhydride, the concentration of which in the copolymer is between 0.3 and 10% by weight, the concentration of ethylene being 90 to 99.7% by weight.

* * * * *